(12) United States Patent
Hein et al.

(10) Patent No.: US 11,349,364 B2
(45) Date of Patent: May 31, 2022

(54) STATOR OF AN ELECTRICAL MACHINE

(71) Applicant: Robert Bosch GmbH, Stuttgart (DE)

(72) Inventors: Tobias Hein, Gronau (Leine) Ot Eitzum (DE); Fabian Lange, Hannover (DE); Patrick Priebe, Hannover (DE); Stefan Ossenkopp, Harsum (DE)

(73) Assignee: Robert Bosch GmbH, Stuttgart (DE)

( * ) Notice: Subject to any disclaimer, the term of this patent is extended or adjusted under 35 U.S.C. 154(b) by 643 days.

(21) Appl. No.: 16/316,116

(22) PCT Filed: May 11, 2017

(86) PCT No.: PCT/EP2017/061286
§ 371 (c)(1),
(2) Date: Jan. 8, 2019

(87) PCT Pub. No.: WO2018/007060
PCT Pub. Date: Jan. 11, 2018

(65) Prior Publication Data
US 2021/0288538 A1    Sep. 16, 2021

(30) Foreign Application Priority Data

Jul. 8, 2016   (DE) .................... 10 2016 212 510.9
Jan. 17, 2017  (DE) .................... 10 2017 200 688.9

(51) Int. Cl.
H02K 3/28    (2006.01)
H02K 1/16    (2006.01)
(Continued)

(52) U.S. Cl.
CPC ............ *H02K 3/28* (2013.01); *H02K 1/16* (2013.01); *H02K 3/12* (2013.01); *H02K 15/0081* (2013.01);
(Continued)

(58) Field of Classification Search
CPC .................................................. H02K 2213/03
(Continued)

(56) References Cited

U.S. PATENT DOCUMENTS 6,181,043 B1 *   1/2001   Kusase ............ H02K 3/12
                                                    310/180
2003/0159269 A1 * 8/2003  Lenoir ........... H02K 15/0056
                                                    29/596

(Continued)

FOREIGN PATENT DOCUMENTS

DE   60001526 T2   10/2003
EP   1364440       11/2013
JP   2014007794 A  1/2014

OTHER PUBLICATIONS

Xu et al., "Electrical automation control technology training course", Chengdu University of Electronic Science and Technology Press, 2008, 18 pages.

(Continued)

*Primary Examiner* — Quyen P Leung
*Assistant Examiner* — Minki Chang
(74) *Attorney, Agent, or Firm* — Michael Best & Friedrich LLP

(57) ABSTRACT

A stator of an electrical machine which has stator slots and conductor elements arranged in the stator slots, which conductor elements each have two conductor ends, is already known. A plurality of conductor ends, which are situated next to one another, of different conductor elements are in each case connected to one another by means of a weld connection, which is provided at the end sides of the conductor ends in question, without additional material. The conductor ends which are connected to one another in each case form a common rectangular conductor cross section which has a height H and a width B, wherein the height H (Continued)

corresponds to the height h of an individual cross section of the conductor ends, and the width B of the common conductor cross section is made up of the sum of the widths b of the individual cross sections of the conductor ends. The weld connection is in each case provided, as seen in the direction of the width B, between two non-melted edge sections of the outermost conductor ends. The weld cross section in the direction of the height H is comparatively low, this having effects on the long-tem mechanical strength of the weld connection and, during operation of the electrical machine, possibly causing temperature peaks at the weld connection as a result of a high current density. In the case of the stator according to the invention, the mechanical strength of the weld connection is increased. According to the invention, it is provided that the extent (L2) of the weld connection (8) in the direction of the height (H) is greater, at least in sections, than the height (H) of the common conductor cross section (9), and the surface of the weld connection (8) is consequently sunken in relation to the end sides (6) of the edge sections (10).

15 Claims, 2 Drawing Sheets

(51) Int. Cl.
  *H02K 3/12* (2006.01)
  *H02K 15/00* (2006.01)
  *H02K 15/10* (2006.01)
(52) U.S. Cl.
  CPC ....... *H02K 15/105* (2013.01); *H02K 2213/03* (2013.01)
(58) Field of Classification Search
  USPC .......................................... 310/195, 202, 206
  See application file for complete search history.

(56) References Cited

U.S. PATENT DOCUMENTS

| | | | |
|---|---|---|---|
| 2014/0048518 A1* | 2/2014 | Ogura | B23K 26/082 219/121.64 |
| 2014/0360756 A1* | 12/2014 | Honda | H01B 3/308 174/119 C |
| 2016/0118869 A1 | 4/2016 | Nakano et al. | |
| 2018/0248430 A1* | 8/2018 | Umesaki | H02K 15/0421 |

OTHER PUBLICATIONS

International Search Report for Application No. PCT/EP2017/061286 dated Sep. 4, 2017 (English Translation, 2 pages).

* cited by examiner

STATOR OF AN ELECTRICAL MACHINE

BACKGROUND OF THE INVENTION

The invention relates to a stator of an electrical machine.

A stator of an electrical machine is already known from EP 1 364 440 B1, which comprises stator slots and conductor elements that are arranged in the stator slots and that each have two conductor ends. Multiple adjacent-lying conductor ends of different conductor elements are mutually connected without the use of an additional material by means of a weld connection that is provided at the end faces of the relevant conductor ends. The mutually connected conductor ends each form a common four-cornered conductor cross section that has a height H and a width B, wherein the height H corresponds to the height h of an individual cross section of the conductor ends, and the width B of the common conductor cross section is formed from the sum of the width b of the individual cross sections of the conductor ends. The weld connection is provided in each case, when viewed in the direction of the width B, between two boundary sections of the outermost conductor ends, said boundary sections not being melted. The weld cross section in the direction of the height H is comparatively small, which influences the mechanical fatigue strength of the weld connection and during the operation of the electrical machine may cause temperature spikes at the weld connection as a result of a high current density.

SUMMARY OF THE INVENTION

In contrast, the stator of an electrical machine in accordance with the invention has the advantage that the mechanical strength of the weld connection increases and the temperature spikes at the weld connection are at least reduced in that the extension of the weld connection in the direction of the height H is greater at least in sections than the height H of the common conductor cross section. As a result, when viewed in the direction of the height H, the weld connection protrudes beyond the boundary sections of the outermost conductor ends. In order to produce the weld connection that protrudes or overhangs at both sides, it is necessary to use material that originates from the molten weld pool and the surface of the weld connection is able to sink in with regard to the end faces of the boundary sections. The sunken weld connection has the advantage that it does not increase the size of the winding head when viewed in the axial direction of the stator, with the result that accordingly less installation space is required.

In accordance with one advantageous embodiment, the weld connection in the case of a plan view of the end faces of the relevant conductor ends is configured in an oval shape or a circular shape. Furthermore, when viewed in the direction of the longitudinal extension of the weld connection, the weld connection has an oval cross section.

It is particularly advantageous if the ratio of the width B with respect to the height H of the common conductor cross section is greater than two since in this manner it is easier for the molten weld pool to sink in and consequently the winding head is prevented from increasing in size in the axial direction.

It is furthermore advantageous if the cross section of the conductor ends each have a height h and a width b, wherein the ratio of the width b with respect to the height h of the cross section of the conductor ends is in each case greater than or equal to one. In this manner, a favorable aspect ratio is also achieved for two conductor ends that are to be connected, which facilitates the sinking in of the molten weld pool. When using the ratio of the width b with respect to the height h of the cross section of the conductor ends that in each case is greater than or equal to 1.4, it is possible to use flat wires that place fewer demands on the procedure of coating the coated wire.

It is very advantageous if the cross section of the conductor ends is configured in each case in a square-shaped or rectangular manner, in particular with rounded edges, since it is possible in this manner to achieve a higher fill factor for the electrical machine.

BRIEF DESCRIPTION OF THE DRAWINGS

One exemplary embodiment of the invention is illustrated in a simplified view in the drawing and further described in the description below.

DETAILED DESCRIPTION

Figure 1:
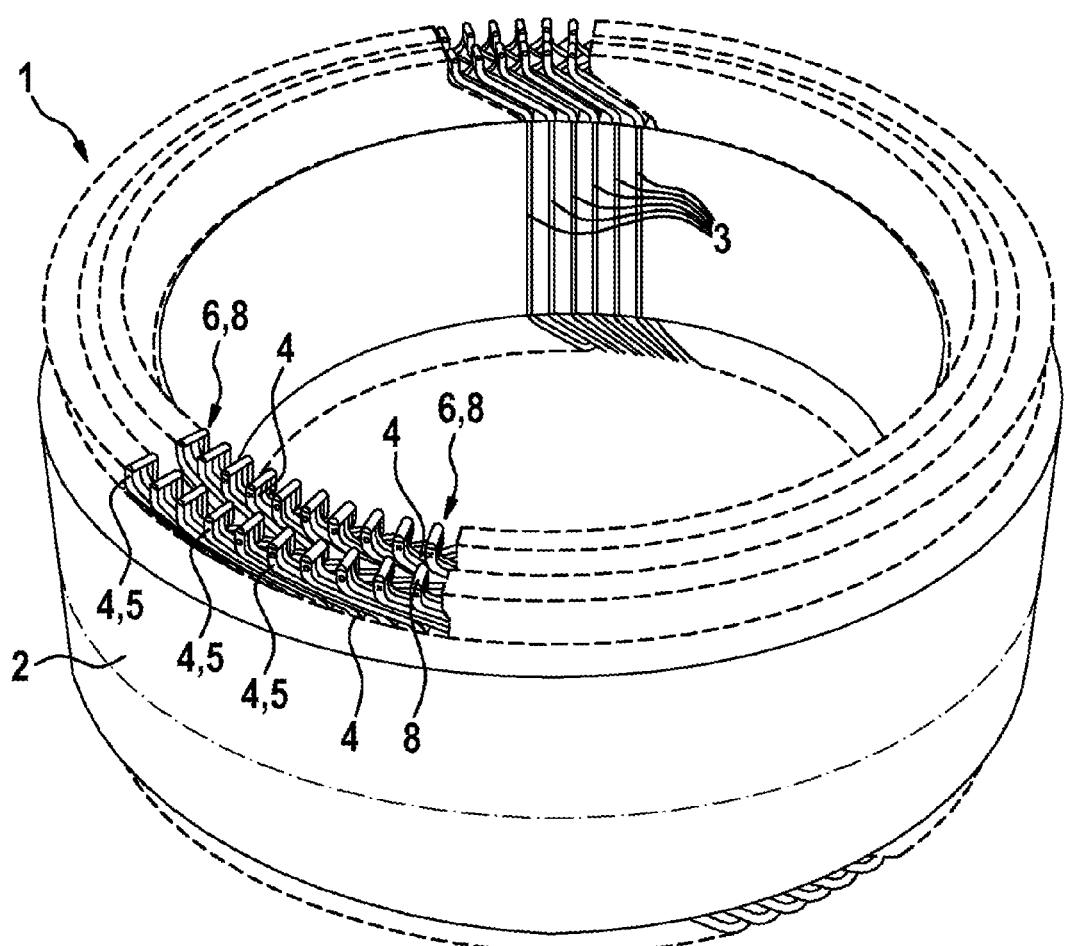
FIG. 1 illustrates a three-dimensional view of a stator of an electrical machine, in which the invention may be used.

FIG. 1 illustrates a three-dimensional view of a stator of an electrical machine in which the invention may be used.

The stator 1 of the electrical machine comprises a stack of stator sheets 2 having stator slots 3. Conductor elements 4 of an electrical winding are provided in the stator slots 3, said conductor elements each having two conductor ends 5. In order to form an electrical winding, by way of example a multi-phase winding, it is necessary to mutually connect the conductor ends 5 of the multiplicity of conductor elements 4 in a bonded manner in accordance with a so-called winding pattern. For this purpose, in each case two or more adjacent-lying conductor ends 5 of different conductor elements 4 are mutually connected by means of a weld connection or a weld seam 8. This weld connection 8 is provided on the end faces 6 of the relevant conductor ends 5 and is produced using a laser and without the use of an additional material. After the welding procedure, the weld connections 8 may be surrounded in each case by an insulation [not illustrated], in order to avoid spark-overs between conductor ends 5 of different electrical phases.

Figure 2:
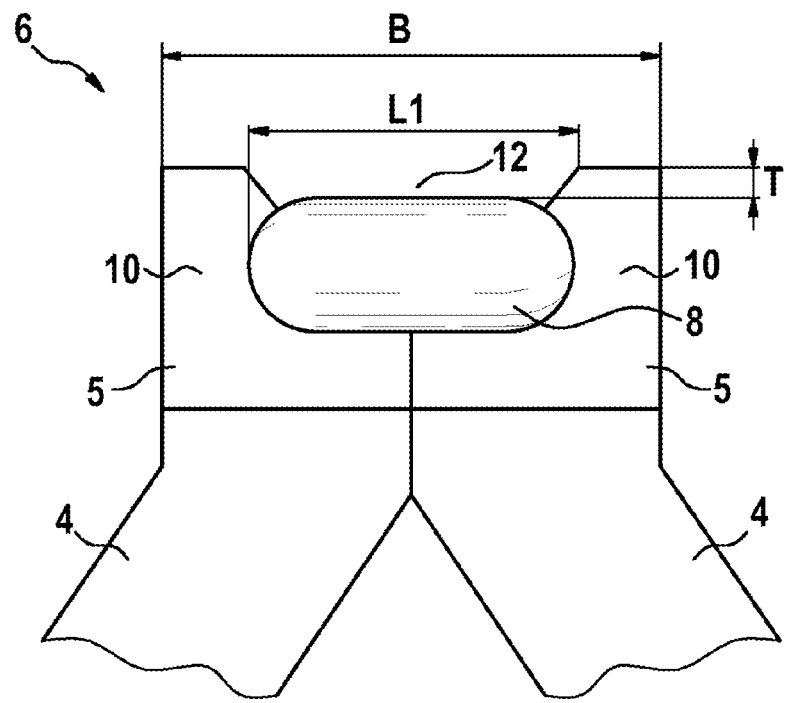
FIG. 2 illustrates a lateral view of a weld connection in accordance with the invention and between two conductor ends of two conductor elements and FIG. 3 illustrates a plan view of the weld connection shown in FIG. 2.

FIG. 2 illustrates a lateral view of a weld connection in accordance with the invention and between two conductor ends of two conductor elements. In the view shown in FIG. 2, parts that are identical or function in an identical manner to those in the view shown in FIG. 1 are identified by the same reference numeral.

The end faces 6 of the conductor ends 5 that are to be connected are provided flush with one another. The individual cross-sections of the conductor ends 5 each have a height h and a width b. The conductor ends 5 that are to be mutually connected each form a common four-cornered, in particular rectangular, conductor cross section 9 that has a height H and a width B, wherein the height H corresponds to the height h of the individual cross sections of the conductor ends 5 and the width B of the common conductor cross section 9 is formed from the sum of the width b of the individual cross sections of the conductor ends 5. The term 'common conductor cross section 9' is also intended to mean the cross section that is produced by means of arranging the four-cornered, in particular rectangular, individual cross sections of the conductor ends 5 adjacent to one another. The individual cross sections have by way of example rounded edges. The ratio of the width B with respect to the height H of the common conductor cross section 9 is greater than two. The ratio of the width b with respect to the height h of each individual cross section of the conductor ends 5 is greater than or equal to one. The conductor ends 5 that are to be mutually connected have a common periphery that is formed by means of two opposite-lying wide peripheral sides U1 and two opposite-lying narrow peripheral sides U2.

According to the exemplary embodiment shown in FIG. 2, two conductor ends 5 are connected by means of the weld connection 8. The weld connection 8 is provided, when viewed in the direction of the width B, between two non-melted boundary sections 10 of the outermost conductor ends 5. The weld connection 8 is therefore configured in such a manner that, when viewed in the direction of the width B, the boundary sections 10 are not melted at the two opposite-lying edges of the common conductor cross sections 9. Consequently, the weld seam 8 does not extend with its longitudinal extension L1 over the entire width B of the common conductor cross section 9.

It is provided in accordance with the invention that the extension L2 of the weld connection 8 in a transverse manner, by way of example in a perpendicular manner, with respect to the longitudinal extension L1 in the direction of the height H is greater at least in sections than the height H of the common conductor cross section 9 and as a result the surface of the weld connection 8 is sunken in with regard to the end faces 6 of the boundary sections 10. The reference point for sinking in the weld connection may also be the entire end face 6 of the conductor ends 5 prior to the welding procedure.

By virtue of the embodiment in accordance with the invention, the weld connection 8 protrudes with its extension L2 at the two wide peripheral sides U1 beyond the boundary sections 10 of the outermost conductor ends 5. Furthermore, the weld connection 8 protrudes on two sides beyond the peripheral sides U1 in the region directly below the weld connection 8.

The surface of the weld connection 8 is sunk in over the entire extension L1 of the weld connection 8 by a specific depth T with the result that a depression 12 is formed. The material from the depression 12 has run into the two laterally protruding sections 8.1 of the weld connection 8. The weld connection 8 has an oval cross section, when viewed in the direction of the longitudinal extension L1 of the weld connection 8, The weld connection 8 is configured in an oval shape or a circular shape, when viewed in the direction of the end faces of the relevant conductor ends.

The weld connection 8 in accordance with the invention is performed according to the following method steps: initially, the conductor ends that are to be connected are stripped of insulation and arranged adjacent to one another. Subsequently, the material at the end faces 6 of the conductor ends 5 is locally melted by means of moving a laser beam to and fro in a pendulum manner, wherein the pivot range of the laser is adjusted in such a manner that the weld pool that is formed is retained between a non-melted boundary section 10 of one of the two outermost conductor elements 4 and a non-melted boundary section 10 of the other outermost conductor element 4. The weld parameters, in particular the power of the laser, a beam thickness of the laser and a weld time are adjusted in such a manner that the extension of the weld connection in the direction of the height H is greater at least in sections than the height H of the common conductor cross section 9.

The mutually welded conductor ends 5, in particular the boundary sections 10 of the conductor ends 5, may be configured at their edges in each case in a rounded manner in order by virtue of avoiding burrs and tips to achieve a reduced concentration of field lines and consequently to improve the insulation or rather dielectric strength. It is possible after the welding procedure to apply an electrically insulating insulation coating [not illustrated] to the rounded, mutually welded conductor ends 5. By virtue of the mutually welded conductor ends 5 being rounded, the insulation coating at the welded conductor ends 5 has a more uniform thickness than in the case of non-rounded conductor ends 5. Without the conductor ends 5 being rounded, the insulation coating would be less thick at the edges, burrs or tips of the conductor ends 5 with the result that the insulation or rather dielectric strength would be reduced at these sites. It is possible to round off the conductor ends 5 by way of example by means of a mechanical processing procedure prior to welding the conductor ends 5 or during a welding process by means of melting the edges or after the welding procedure by means of a mechanical processing procedure.

Figure 3:
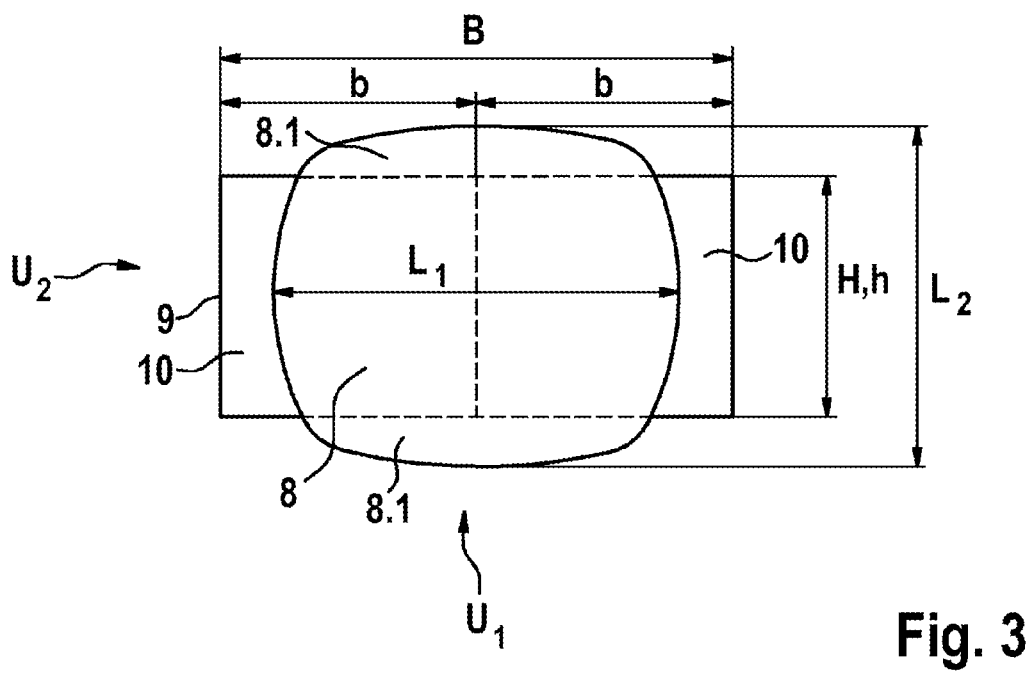

FIG. 3 illustrates a plan view of the end face of the conductor ends with the weld connection shown in FIG. 2. In the view shown in FIG. 3, parts that are identical or function in an identical manner to those in the view shown in FIG. 1 and FIG. 2 are identified by the same reference numeral.

What is claimed is:

1. A stator of an electrical machine, the stator having stator slots (3) and conductor elements (4) that are arranged in the stator slots (3) and that each comprise two conductor ends (5), wherein multiple adjacent-lying conductor ends (5) of different conductor elements (4) are mutually connected without the use of an additional material by means of a weld connection (8) at end faces (6) of the relevant conductor ends (5), wherein the mutually connected conductor ends (5) each form a common four-cornered conductor cross section (9) that has a height (H) and a width (B), wherein the height (H) corresponds to a height (h) of an individual cross section of the conductor ends (5) and the width (B) of the common conductor cross section (9) is formed from the sum of a width (b) of the individual cross sections of the conductor ends (5), wherein the weld connection (8) is provided in each case, when viewed in the direction of the width (B) of the common conductor cross section (9), between two boundary sections (10) of outermost conductor ends (5), said boundary sections not being melted, characterized in that an extension (L2) of the weld connection (8) in the direction of the height (H) of the common conductor cross section (9) is greater at least in sections than the height (H) of the common conductor cross section (9) and a surface of the weld connection (8) with regard to the end faces (6) of the boundary sections (10) is sunk in as a result, wherein the entire boundary sections (10) between the conductor end (5) and the weld connection (8) are rounded along the height (H).

2. The stator as claimed in claim 1, characterized in that the weld connection (8), when viewed in the direction of the height (H) of the common conductor cross section (9), protrudes beyond the boundary sections (10) of the outermost conductor ends (5).

3. The stator as claimed in claim 1, characterized in that the surface of the weld connection (8) is sunken in over an entire longitudinal extension (L1) of the weld connection (8).

4. The stator as claimed in claim 1, characterized in that the weld connection (8) in the case of a plan view of the end faces (6) of the relevant conductor ends (5) is configured in an oval shape or a circular shape.

5. The stator as claimed in claim 1, characterized in that, when viewed in the direction of a longitudinal extension (L1) of the weld connection (8), the weld connection has an oval cross section.

6. The stator as claimed in claim 1, characterized in that the ratio of the width (B) of the common conductor cross section (9) with respect to the height (H) of the common conductor cross section (9) is greater than two.

7. The stator as claimed in claim 1, wherein the ratio of the width (b) of the individual cross section of the conductor ends (5) with respect to the height (h) of the individual cross section of the conductor ends (5) is in each case greater than or equal to one.

8. The stator as claimed in claim 1, characterized in that the individual cross section of the conductor ends (5) is configured in each case in a square-shaped or rectangular manner.

9. The stator as claimed in claim 1, characterized in that the mutually connected conductor ends (5) are configured in a rounded manner.

10. The stator as claimed in claim 1, characterized in that the weld connection (8) is surrounded by an electrical insulation.

11. A method for producing the stator as claimed in claim 1, comprising the steps:
   stripping insulation from the conductor ends (5) that are to be connected,
   arranging the conductor ends (5) adjacent to one another,
   locally melting the material at the end faces (6) of the conductor ends (5) by moving a laser beam to and fro in a pendulum manner, wherein a pivot range of the laser beam is adjusted in such a manner that a weld pool that is formed is retained between a non-melted boundary section (10) of one of the two outermost conductor elements (4) and a non-melted boundary section (10) of the other outermost conductor element (4),
   adjusting weld parameters in such a manner that the extension (L2) of the weld connection (8) of the common conductor cross section (9) in the direction of the height (H) is greater at least in sections than the height (H) of the common conductor cross section (9).

12. The method as claimed in claim 11, comprising in addition the step:
   applying an insulation coating to the mutually welded conductor ends.

13. The method as claimed in claim 11, wherein the step of locally melting the material at the end faces (6) creates a depression (12) that is sunk into the conductor ends (5) by a depth (T).

14. The stator as claimed in claim 1, characterized in that the individual cross section of the conductor ends (5) is configured in each case in a square-shaped or rectangular manner with rounded edges.

15. A method for producing a weld connection (8) for a stator of an electrical machine, the stator having stator slots (3) and conductor elements (4) that are arranged in the stator slots (3) and that each comprise two conductor ends (5), wherein multiple adjacent-lying conductor ends (5) of different conductor elements (4) are mutually connected without the use of an additional material by means of the weld connection (8) at end faces (6) of the relevant conductor ends (5), wherein the mutually connected conductor ends (5) each form a common four-cornered conductor cross section (9) that has a height (H) and a width (B), wherein the height (H) corresponds to a height (h) of an individual cross section of the conductor ends (5) and the width (B) of the common conductor cross section (9) is formed from the sum of a width (b) of the individual cross sections of the conductor ends (5), wherein the weld connection (8) is provided in each case, when viewed in the direction of the width (B) of the common conductor cross section (9), between two boundary sections (10) of outermost conductor ends (5), said boundary sections not being melted, characterized in that an extension (L2) of the weld connection (8) in the direction of the height (H) of the common conductor cross section (9) is greater at least in sections than the height (H) of the common conductor cross section (9) and a surface of the weld connection (8) with regard to the end faces (6) of the boundary sections (10) is sunk in as a result, the method comprising the steps:
   stripping insulation from the conductor ends (5) that are to be connected,
   arranging the conductor ends (5) adjacent to one another,
   locally melting the material at the end faces (6) of the conductor ends (5) by moving a laser beam to and fro in a pendulum manner, wherein a pivot range of the laser beam is adjusted in such a manner that a weld pool that is formed is retained between a non-melted boundary section (10) of one of the two outermost conductor elements (4) and a non-melted boundary section (10) of the other outermost conductor element (4),
   adjusting the power of the laser beam, a beam thickness of the laser beam and a weld time in such a manner that the extension (L2) of the weld connection (8) of the common conductor cross section (9) in the direction of the height (H) is greater at least in sections than the height (H) of the common conductor cross section (9).

* * * * *